(12) United States Patent
Kimmel et al.

(10) Patent No.: US 7,155,458 B1
(45) Date of Patent: Dec. 26, 2006

(54) MECHANISM FOR DISTRIBUTED ATOMIC CREATION OF CLIENT-PRIVATE FILES

(75) Inventors: Jeffrey S. Kimmel, Chapel Hill, NC (US); Arthur Lent, Cambridge, MA (US); Don Bolinger, Concord, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 534 days.

(21) Appl. No.: 10/117,537

(22) Filed: Apr. 5, 2002

(51) Int. Cl.
*G06F 17/30* (2006.01)
*G06F 7/00* (2006.01)

(52) U.S. Cl. .................... 707/200; 707/10; 707/102
(58) Field of Classification Search ............... 707/200, 707/204, 10, 101, 8, 102
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,963,962 A | 10/1999 | Hitz et al. | |
| 5,968,134 A * | 10/1999 | Putzolu et al. | 709/238 |
| 6,038,570 A | 3/2000 | Hitz et al. | |
| 6,065,037 A | 5/2000 | Hitz et al. | |
| 6,192,365 B1 * | 2/2001 | Draper et al. | 707/101 |
| 6,249,879 B1 * | 6/2001 | Walker et al. | 714/11 |
| 6,389,420 B1 * | 5/2002 | Vahalia et al. | 707/8 |
| 6,401,093 B1 * | 6/2002 | Anand et al. | 707/10 |
| 6,425,035 B1 | 7/2002 | Hoese et al. | |
| 6,564,215 B1 * | 5/2003 | Hsiao et al. | 707/8 |
| 6,718,327 B1 * | 4/2004 | Edmonds | 707/8 |
| 2002/0112008 A1 * | 8/2002 | Christenson et al. | 709/206 |
| 2002/0112022 A1 | 8/2002 | Kazar et al. | |
| 2002/0116593 A1 | 8/2002 | Kazar et al. | |
| 2002/0152226 A1 * | 10/2002 | Burnett | 707/200 |
| 2002/0178162 A1 * | 11/2002 | Ulrich et al. | 707/10 |
| 2003/0155439 A1 * | 8/2003 | Winner | 239/533.2 |
| 2004/0083245 A1 * | 4/2004 | Beeler, Jr. | 707/204 |
| 2004/0177174 A1 * | 9/2004 | Yamamoto | 710/8 |

OTHER PUBLICATIONS

SunSite Alberta—Perl Documentation, perl-5.6.1, sunsite@sunsite.ualberta, May 8, 2001.*
Frequently Asked Questions about Isof, Vic Abell, abel@purdue.edu, Jan. 22, 2002.*
L. Stein: CGI.pm—a Perl5 CGI Library, Version 2.37b3, Aug. 29, 1997.*
Christiansen et al: Perl Cookbook, Section 14.7, Aug. 1998, O'Reilly.*

(Continued)

*Primary Examiner*—John Cottingham
*Assistant Examiner*—Kuen S. Lu
(74) *Attorney, Agent, or Firm*—Cesari and McKenna, LLP

(57) ABSTRACT

A mechanism enables distributed atomic creation of client-private files using a distributed file system protocol. The mechanism provides an unlinked open operation that enables the distributed atomic creation of a client-private file that is not accessible by other clients. That is, the unlinked open operation creates a file, but does not generate a path name to the file within a file system. The unlinked open operation thus permits clients utilizing the file system protocol to create temporary or "scratch files" that are not accessible by other clients.

12 Claims, 5 Drawing Sheets

OTHER PUBLICATIONS

David Hitz et al. TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

DAFS: Direct Access File System Protocol, Version 1.0, Network Appliance, Inc., Sep. 1, 2001.

Virtual Interface Architecture Specification, Version 1.0, published by a collaboration between Compaq Computer Corp., Intel Corp., and Microsoft Corp., Dec. 16, 1997.

* cited by examiner

MECHANISM FOR DISTRIBUTED ATOMIC CREATION OF CLIENT-PRIVATE FILES

FIELD OF THE INVENTION

The present invention relates to file systems and, more specifically, to the creation of client-private files within a file system.

BACKGROUND OF THE INVENTION

A file server is a computer that provides file service relating to the organization of information on writeable persistent storage devices, such as memories, tapes or disks. The file server or filer may be embodied as a storage system including a storage operating system that implements a file system to logically organize the information as a hierarchical structure of directories and files on, e.g. the disks. Each "on-disk" file may be implemented as a set of data structures, e.g. disk blocks, configured to store information, such as the actual data for the file. A directory, on the other hand, may be implemented as a specially formatted file in which information about other files and directories is stored.

A filer may be further configured to operate according to a client/server model of information delivery to thereby allow many client systems (clients) to access shared resources, such as files, stored on a server, e.g. the filer. In this model, the client may comprise an application, such as a database management system (DBMS), executing on a computer that "connects" to the filer over a computer network, such as a point-to-point link, shared local area network (LAN), wide area network (WAN) or virtual private network (VPN) implemented over a public network, such as the Internet. Each client may request the services of the filer by issuing file system protocol messages (in the form of packets) to the filer over the network. By supporting a plurality of file system protocols, such as the Direct Access File System (DAFS) protocol, the utility of the filer may be enhanced for networking clients. The DAFS protocol is a distributed file system protocol that, inter alia, defines a set of file management and file access operations.

In certain client/server environments, clients may desire to create a client-private file. As used herein, the term client-private generally means that a file is not "visible" to other clients of a file server other than to the client creating the client-private file. The client-private file may be stored on-disk, but may not be incorporated into the directory structure associated with the file system; accordingly, other clients cannot identify or access the file. In effect, a client creating a client-private file is creating a "scratch pad" for temporary storage of data. The client may, at a later time, decide to permanently store the data in the file. In such a case, the client can "link" the client-private file to the file system so that it is accessible to any clients of the file system.

A DBMS application is an example of a client application that would utilize client-private files. The DBMS application is a program that allows one or more users or clients to create and access data stored in a set of files or database coupled to, e.g., a filer. In particular, the DBMS application manages client requests to access the database without requiring them to specify the physical location of the data on the storage devices. In handling client requests, the DBMS application ensures the integrity of the data (i.e., ensuring that the data continues to be accessible and is consistently organized as intended) and the security of the data (i.e., ensuring only those with appropriate privileges can access the data). The integrity and security of a database is particularly relevant in parallel or distributed system computing environments.

In known file system protocol implementations, such as the DAFS protocol, a client-private file can be created through the use of a two-step procedure. First, the client creates the file using the standard file open functions of the file system protocol. By opening the file, the file system protocol returns a file handle, which uniquely identifies the file and its path. After opening or creating the file, the client then unlinks the file, i.e., removes the path name from the file while retaining the file handle. Removal of the path name prevents other clients from identifying or accessing the file by, e.g., scanning a directory path structure associated with the file system.

A disadvantage of this known two-step procedure involves a crash or other error condition/failure experienced by the client between creation and unlinking of the files that results in client-private files no longer being associated with an active client. If, for example, a client created a client-private file and then suffered a failure before unlinking the file, the opened file would remain in the file system. This would require a search to obtain, and then eliminate, the previously opened, but not unlinked file. If the file is not found and eliminated, the file system would become populated with such unused files. This would result in the consumption of storage capacity within the file system, thereby reducing the available file system storage space for files that are used by clients of the file server.

Therefore, the present invention is directed to a mechanism that reduces the consumption of storage capacity for previously opened, but not unlinked files. The invention is also directed, in part, to providing support for the creation of unlinked files using a distributed file system protocol, such as the DAFS protocol.

SUMMARY OF THE INVENTION

The disadvantages of the prior art are overcome by providing a mechanism that enables distributed atomic creation of client-private files using a distributed file system protocol. According to the invention, the mechanism provides an unlinked open operation that enables the distributed atomic creation of a client-private file that is not accessible by other clients. That is, the novel unlinked open operation creates a file, but does not generate a path name to the file within a file system. The unlinked open operation thus permits clients utilizing the file system protocol to create temporary or "scratch files" that are not accessible by other clients.

In the illustrative embodiment, the distributed file system protocol is preferably the direct access file system (DAFS) protocol employed by clients of a file server, such as a filer, to access a shared resource, such as a file. The novel unlinked open operation extends the DAFS protocol to enable generation of an inode for the file, but does not allow linking of the generated inode to a directory structure of the file system. As the resulting "client-private" file is not linked within the directory structure of the file system, the file is not accessible by other clients of the filer.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF ILLUSTRATIVE EMBODIMENTS

A. Storage System Environment

Figure 1:
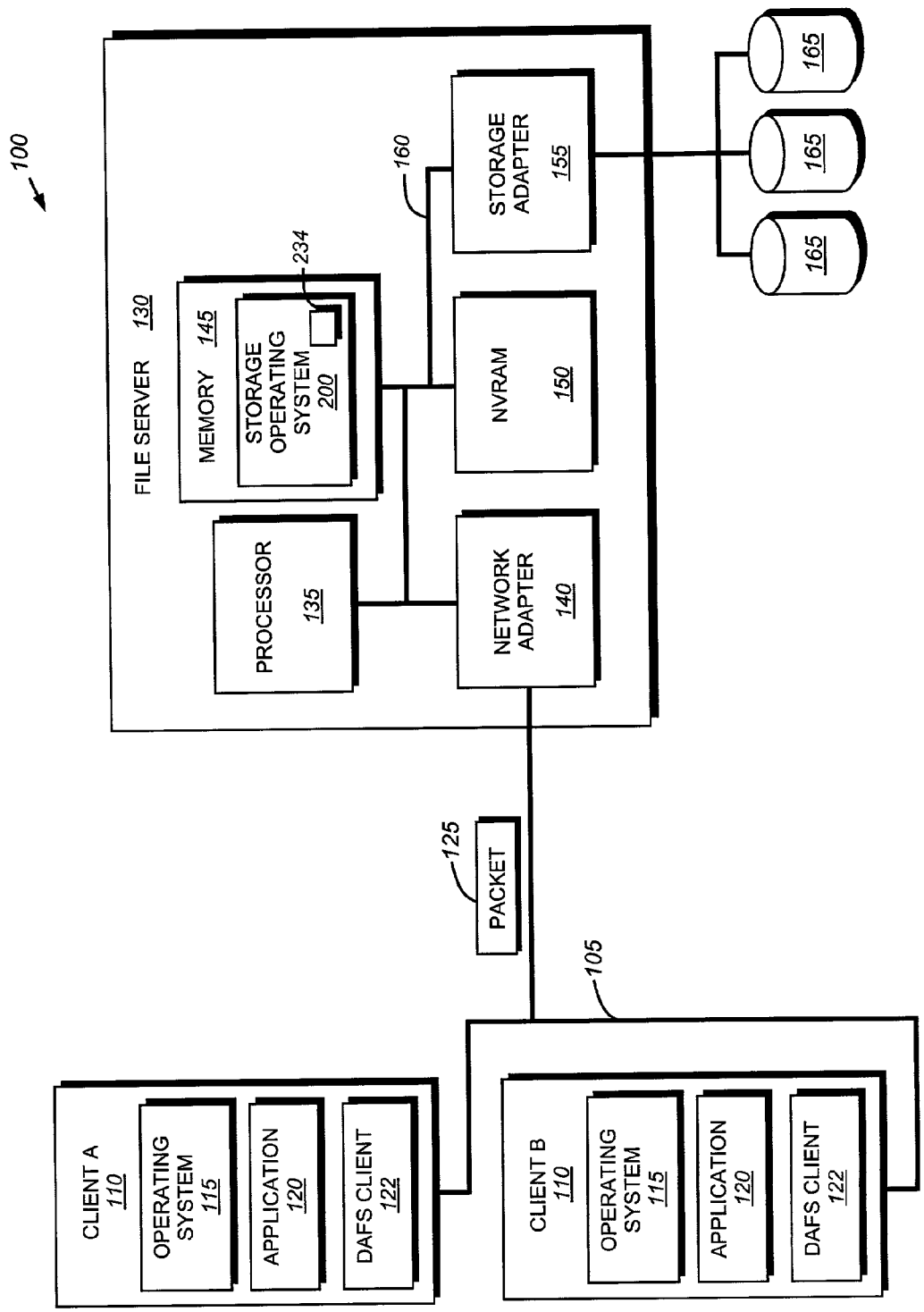
FIG. 1 is a schematic block diagram of an exemplary network environment including a plurality of clients in a file server that may be advantageously used for the present invention.

FIG. 1 is a schematic block diagram of a storage system environment 100 that includes a plurality of clients 110, each having an operating system 115 and one or more applications 120, and an interconnected file server 130 that may be advantageously used with the present invention. The filer server or "filer" 130 is a computer that provides file service relating to the organization of information on storage devices, such as disks 165. It will be understood to those skilled in the art that the inventive technique described herein may apply to any type of special-purpose computer (e.g., server) or general-purpose computer, including a standalone computer. The filer 130 comprises a processor 135, a memory 145, a network adapter 140 and a storage adapter 155 interconnected by a system bus 160. The filer 130 also includes a storage operating system 200 located in memory 145 that implements a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. To that end, filer 130 can be broadly, and alternatively, referred to as a storage system. Moreover, the teachings of this invention can be adapted to a variety of storage system architectures including, but not limited to, a network-attached storage environment, a storage area network and disk assembly directly-attached to a client/host computer. In addition, it would be apparent to those skilled in the art that the inventive mechanism described herein may apply to any type of special-purpose (e.g., file serving application) or general-purpose computer, including a stand alone computer or portion thereof, embodied as or including a storage system.

Each client includes an operating system 115, one or more applications 120 and, in the illustrative embodiment, direct access file system (DAFS) client functionality 122. The DAFS client functionality can be implemented by, e.g., software executing within the operating system and coordinating with an appropriate network interface controller (not shown). In addition, the application 120 executed on the client 110 may comprise a database management system (DBMS) application or any other application that can utilize client-private files as described below. Moreover, the teachings of this invention can be adapted to a variety of storage system architectures, including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

In the illustrative embodiment, the memory 145 comprises storage locations that are addressable by the processor and adapters for storing software program code. The memory comprises a form of random access memory (RAM) that is generally cleared by a power cycle or other reboot operation (i.e. it is a "volatile" memory). The processor and adapters may, in turn, comprise processing elements and/or logic circuitry configured to execute the software code and manipulate the data structures. The operating system 200, portions of which are typically resident in memory and executed by the processing elements, functionally organizes the filer by, inter alia, invoking storage operations in support of a file service implemented by the filer. Included within the storage operating system 200 is support for a DAFS server 234, described further below. It will be apparent to those skilled in the art that other processing and memory means, including various computer readable media, may be used for storing and executing program instructions pertaining to the inventive technique described herein.

The network adapter 140 comprises the mechanical, electrical and signaling circuitry needed to connect the filer 130 to a client 110 over a computer network 105, which may comprise a point-to-point connection or a shared medium, such as a local area network. The client 110 may be a general-purpose computer configured to execute applications 120, such as a DBMS application. Moreover, the client 110 may interact with the filer 130 in accordance with a client/server model of information delivery. That is, the client may request the services of the filer, and the filer may return the results of the services requested by the client, by exchanging packets 125 encapsulating, e.g., the DAFS protocol format over the network 105. The format of DAFS protocol packets exchanged over the network is well-known and described in *DAFS: Direct Access File System Protocol, Version* 1.0, by Network Appliance, Inc., dated Sep. 1, 2001, which is hereby incorporated by reference.

The storage adapter 155 cooperates with the operating system 200 executing on the filer to access information requested by the client. The information may be stored on the disks 165 of a disk array that is attached, via the storage adapter 155, to the filer 130 or other node of a storage system as defined herein. The storage adapter 155 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 135 (or the adapter 155 itself) prior to being forwarded over the system bus 160 to the network adapter 140, where the information is formatted into a packet and returned to the client 110.

In one exemplary filer implementation, the filer 130 can include a nonvolatile random access memory (NVRAM) 150 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the memory, after each client request is completed, but before the result of the request is returned to the requesting client.

B. Storage Operating System

To facilitate generalized access to the disks 165, the storage operating system 200 (FIG. 2) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. As noted above, in the illustrative embodiment described herein, the storage operating system is the NetApp® Data ONTAP™ operating system available from Network Appliance, Inc., that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Again to summarize, as used herein, the term "storage operating system" generally refers to the computer-executable code operable on a storage system that implements file system semantics (such as the above-referenced WAFL) and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 2:
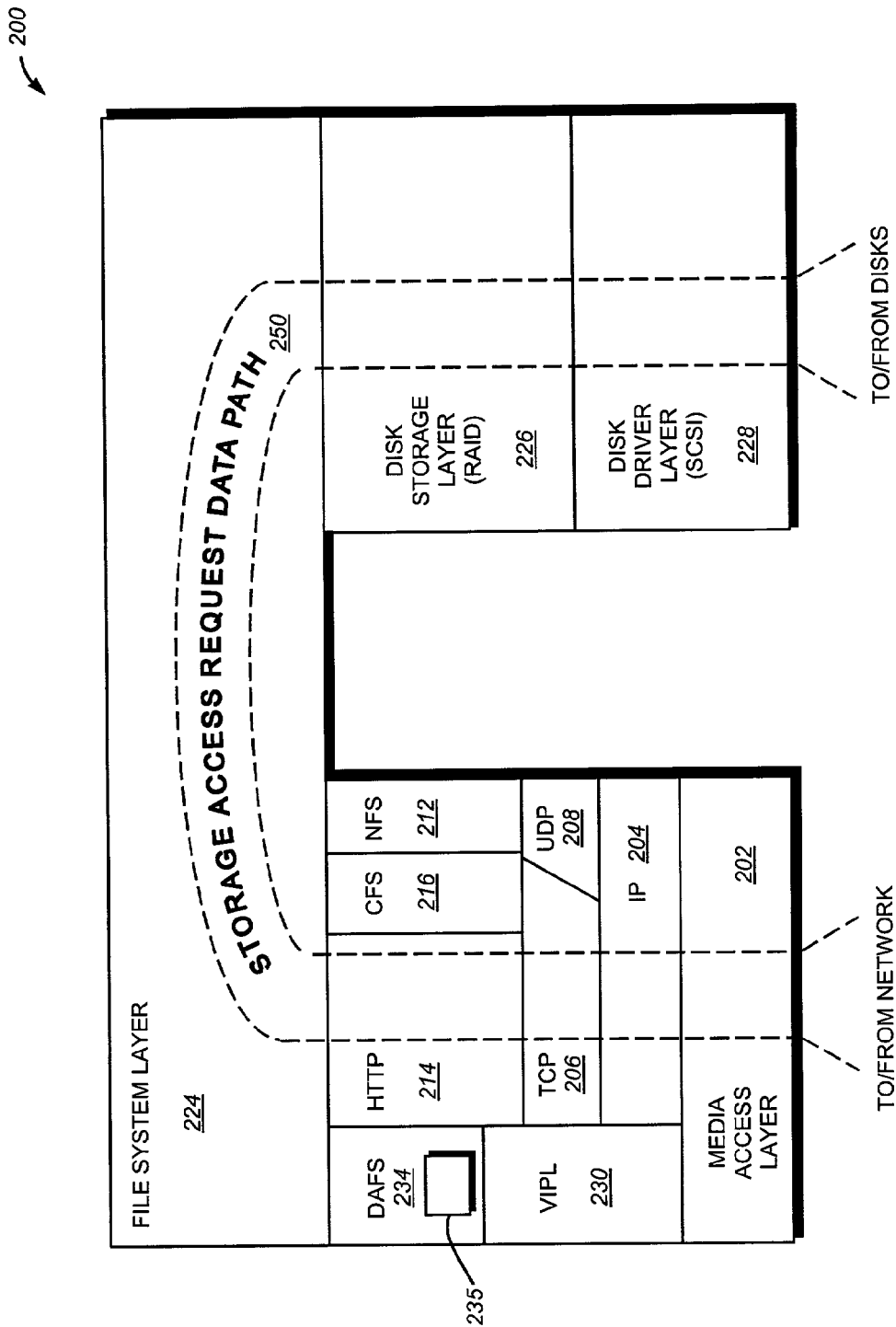
FIG. 2 is a schematic block diagram of an exemplary storage operating system that may be advantageously used with the present invention.

The organization of the preferred storage operating system for the exemplary filer is now described briefly. However, it is expressly contemplated that the principles of this invention can be implemented using a variety of alternate storage operating system architectures. As shown in FIG. 2, the storage operating system 200 comprises a series of software layers, including a media access layer 202 of network drivers (e.g., an Ethernet driver). The operating system further includes network protocol layers, such as the Internet Protocol (IP) layer 204 and its supporting transport mechanisms, the Transport Control Protocol (TCP) layer 206 and the User Datagram Protocol (UDP) layer 208.

Additionally the storage operating system includes a virtual interface provider layer (VIPL) 230, which implements the virtual interface (VI) architecture. The architecture for the virtual interface (VI) is defined in *Virtual Interface Architecture Specification, Version* 1.0, published in collaboration between Compaq Computer Corporation, Intel Corporation and Microsoft Corporation, which is hereby incorporated by reference. This VIPL layer 230 provides the direct access transport capabilities required by the Direct Access File System. The requirements of a direct access transport (DAT) for use by the Direct Access File System are described in the above-incorporated DAFS specification. Generally, a DAT should support remote direct memory access (RDMA) and be capable of transmitting variable-sized data blocks. As such, the VIPL layer 230 should be taken as exemplary only. Any other suitable transport protocol that can accommodate the DAFS protocol can be utilized including, for example, InfiniBand™.

A file system protocol layer provides multi-protocol data access and, to that end, includes support for the CIFS protocol 216, the NFS protocol 212 and the Hypertext Transfer Protocol (HTTP) protocol 214 and the DAFS protocol 234. Within the DAFS layer 234, which implements the functionality associated with a DAFS server, is the implementation of an unlinked open file function 235, described further below. The DAFS layer 234 enables the file server executing the storage operating system 200 to process DAFS requests from clients 110 acting as DAFS clients 122.

In addition, the storage operating system 200 includes a disk storage layer 226 that implements a disk storage protocol, such as a RAID protocol, and a disk driver layer 228 that implements a disk access protocol such as, e.g., a Small Computer Systems Interface (SCSI) protocol.

Bridging the disk software layers with the network and file system protocol layers is a file system layer 224 of the storage operating system 200. Generally, the layer 224 implements a file system having an on-disk format representation that is block-based using, e.g., 4-kilobyte (kB) data blocks and using inodes to describe the files. In response to transaction requests, the file system generates operations to load (retrieve) the requested data from disks 165 if it is not resident "in-core", i.e., in the filer's memory 145. If the information is not in memory, the file system layer 224 indexes into an inode file using the inode number to access an appropriate entry and retrieve a logical volume block number (VBN). The file system layer 224 then passes the logical VBN to the disk storage (RAID) layer 226, which maps that logical number to a disk block number and sends the latter to an appropriate driver (for example, an encapsulation of SCSI implemented on a fibre channel disk interconnection) of the disk driver layer 228. The disk driver accesses the disk block number from disks 165 and loads the requested data in memory 145 for processing by the filer 130. Upon completion of the request, the filer (and storage operating system) returns a reply, e.g., a conventional acknowledgement packet defined by the DAFS specification, to the client 110 over the network 105.

It should be noted that the software "path" 250 through the storage operating system layers described above needed to perform data storage access for the client request received at the filer may alternatively be implemented in hardware or a combination of hardware and software. That is, in an alternate embodiment of the invention, the storage access request data path 250 may be implemented as logic circuitry embodied within a field programmable gate array (FPGA) or an application specific integrated circuit (ASIC). This type of hardware implementation increases the performance of the file service provided by filer 130 in response to a file system request packet 125 issued by client 110.

Figure 3:
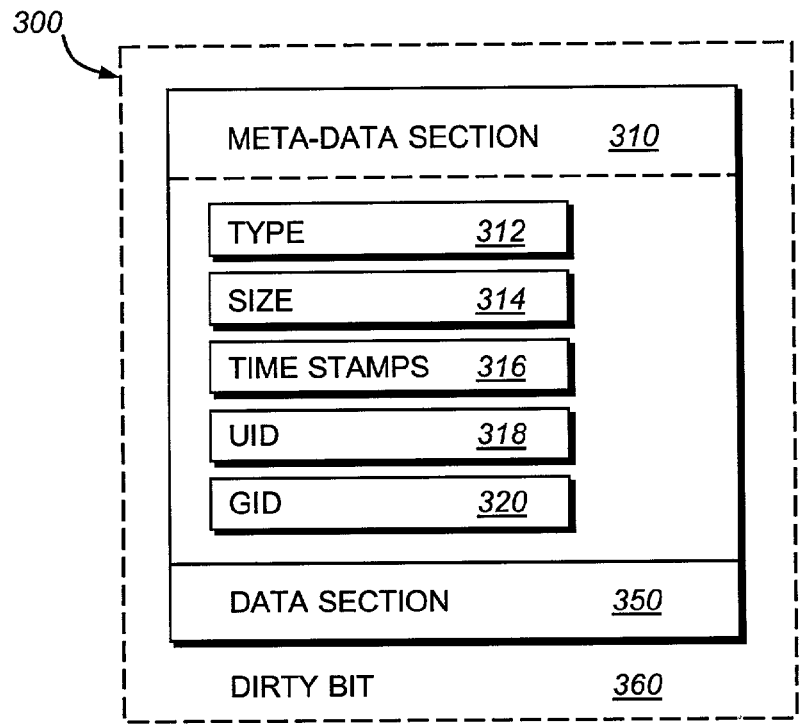
FIG. 3 is a schematic block diagram of an exemplary inode data structure in accordance with an embodiment of this invention.

In the illustrative embodiment, a file is represented in the file system as an inode data structure adapted for storage on the disks. FIG. 3 is a schematic block diagram illustrating an inode 300, which preferably includes a meta-data section 310 and a data section 350. The information stored in the meta-data section 310 of each inode 300 describes the file and, as such, includes the type (e.g., regular or directory) 312 of file, the size 314 of the file, time stamps (e.g., creation, access and/or modification) 316 for the file and ownership, i.e., user identifier (UID 318) and group ID (GID 320), of the file. The contents of the data section 350 of each inode, however, may be interpreted differently depending upon the type of file (inode) defined within the type field 312. For example, the data section 350 of a directory inode contains meta-data controlled by the file system, whereas the data section of a regular inode contains user-defined data. In this latter case, the data section 350 includes a representation of the data associated with the file.

Specifically, the data section 350 of a regular on-disk inode may include user data or pointers, the latter referencing 4 kB data blocks on disk used to store the user data. Each pointer is preferably a logical VBN to thereby facilitate efficiency among the file system and the disk storage (RAID) layer when accessing the data on disks. Given the restricted size (e.g., 128 bytes) of the inode, user data having a size that is less than or equal to 64 bytes is represented, in its entirety, within the data section of that inode. However, if the user data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 450 of the inode (e.g., a level 2 inode) references an indirect block (e.g., a level 1 block) that contains 1024 pointers, each of which references a 4 KB data block (e.g., a level 0 block) on disk. For user data having a size greater than 64 MB, each pointer in the data section 350 of the inode (e.g., a third level inode) references a double-indirect block (e.g., a level 2 block) that contains 1024 pointers, each referencing an indirect, level 1 block. The indirect block, in turn, contains 1024 pointers, each of which references a 4 KB direct level 0 data block on disk. Each data block is loaded from disk 165 into the memory 145 in order to access the data.

Figure 4:
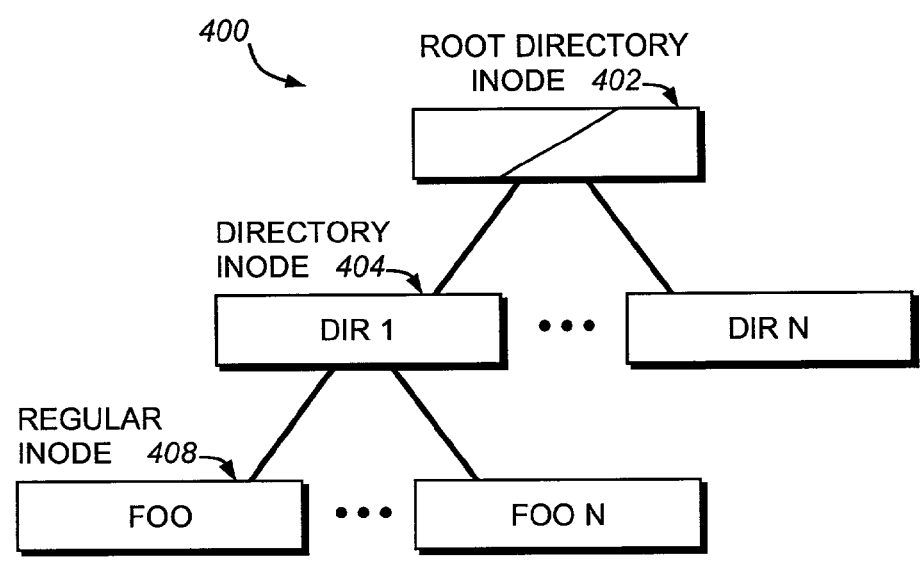
FIG. 4 is a schematic block diagram of an exemplary directory structure in accordance with an embodiment of this invention.

Assume that the full pathname of a file is /dir1/foo. The inode of file foo is retrieved via a series of full pathname lookup operations into an on-disk inode tree structure of the active file system. FIG. 4 is a schematic block diagram illustrating the hierarchical on-disk inode structure 400 of the illustrative file system. Specifically, the file system layer 224 parses the first (/) preceding the pathname dir1 and maps it to a root inode structure 402 of its file system. The root inode is a directory having a plurality of entries, each of which stores a name of a directory or a file and its corresponding inode number. Armed with a name and inode number, the operating system 200 can construct a file handle to retrieve the block (inode) from disk.

Broadly stated, a name is an external representation of an inode data structure, i.e., a representation of the inode as viewed external to a file system. In contrast, the file handle is a unique representation of the data structure, i.e., a representation of the inode data structure that is used internally within the file system. The file handle generally consists of a plurality of components including a file ID (inode number), a snapshot ID, a generation ID and a flag. The file handle is exchanged between the client and server (filer) over the network to enable the filer to efficiently retrieve the corresponding file or directory. That is, the file system may efficiently access a file or directory by mapping its inode number to a block on disk using the inode file. Use of the file handle thus obviates the need to exchange pathnames and perform lookup operations to retrieve the appropriate file or directory inode from disk. The filer returns (to the client) a file handle corresponding to a file upon completion of an operation.

Accordingly, the file system layer loads the root directory inode 402 from disk 165 into memory, such that the root inode is represented as an in-core inode, and loads any data blocks referenced by the in-core root inode. When an on-disk inode (or block) is loaded from disk into memory, its corresponding in-core structure embeds the on-disk structure. For example, the dotted line surrounding the inode 300 (FIG. 3) indicates the in-core representation of the on-disk inode structure. The in-core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently "flushed" (stored) to disk.

The file system layer then searches the contents of the root inode data blocks for a directory name "dir1". If the dir1 directory name is found in those data blocks, the file system layer uses the corresponding inode number to retrieve the dir1 directory inode 404 from disk and loads it (and its data blocks) into memory as in-core inode structure(s). As with the root inode, the directory inode has a plurality of entries; here, however, each entry stores a name of a regular file and its corresponding inode number. The file system layer searches the entries of the dir1 directory inode data blocks to determine whether the regular inode file name "foo" exists and, if so, obtains its corresponding inode number and loads the regular inode 408 from disk into the memory 145.

C. Atomic Creation of Client-Private Files

The present invention comprises a mechanism for the distributed atomic creation of client-private files using a distributed file system protocol, such as the DAFS protocol. The mechanism extends the distributed file system protocol by specifying an unlinked open operation that creates a file, but does not generate a path name to the file within the file system. Thus the unlinked open command generates an inode for the file but does not link the generated inode to the directory structure of the file system. Advantageously, the unlinked open operation permits clients utilizing the file system protocol to create temporary or scratch files that are not accessible by other clients.

Figure 5:
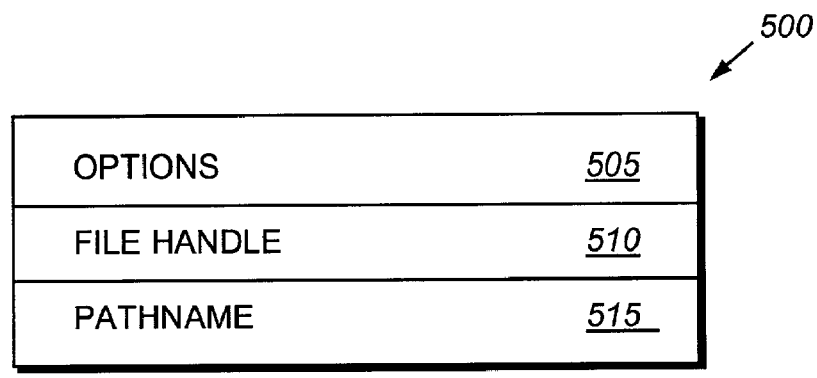
FIG. 5 is a schematic block diagram of an exemplary data structure used as an argument to a typical open file command.

FIG. 5 is a schematic block diagram illustrating a data structure 500 used by a client as an argument to a typical open file operation of a distributed file system protocol. This data structure 500 can be passed to the open function within a designated file system protocol. The argument data structure 500 includes entries describing a set of options 505 for the open command, a file handle 510 and a path name 515. When a client opens a non-client-private file, the client designates a file handle 510 associated with the file to be opened and a path name 515 designating the location of the file from the directory structure of the file system.

Figure 6:
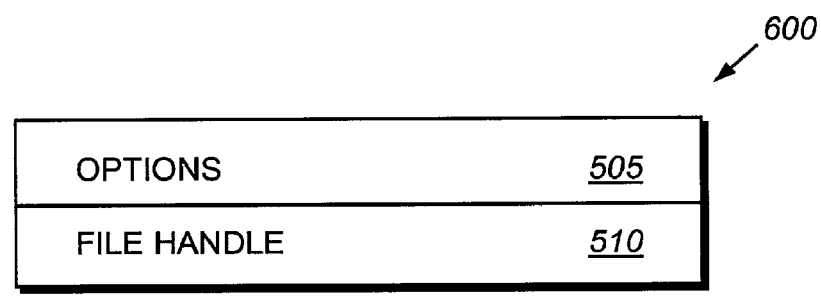
FIG. 6 is a schematic block diagram of an exemplary data structure used as an argument to the novel unlinked open file command in accordance with an embodiment of this invention.

FIG. 6 is a schematic block diagram illustrating a data structure 600 used by a client as an argument to the novel unlinked open operation in accordance with the present invention. The data structure 600 can be passed to the unlinked open function within the distributed file system protocol. In the illustrative embodiment, this unlinked open functionality is added to the DAFS_PROC_OPEN operation described in the above-incorporated DAFS specification. The argument data structure 600 includes entries associated with an options field 505 and a file handle 510. When initiating the unlinked open operation, a client specifies a CLAIM_CREATE_UNLINKED value in the options entry 505 of data structure 600.

In accordance with the novel mechanism described herein, the distributed file system protocol opens a client-private file in the directory associated with the file handle stored in entry 510. In the illustrative embodiment, the unlinked open command returns a file handle that is associated with the client-private file. Thus, the client that opens the client-private file can access the file using traditional input/output (I/O) commands contained within the distributed file system protocol by using the returned file handle as a parameter for those I/O functions. Additionally, the client could transfer the file handle to other clients and/or applications, which could then access the client-private file by using the file handle as a parameter.

Figure 7:
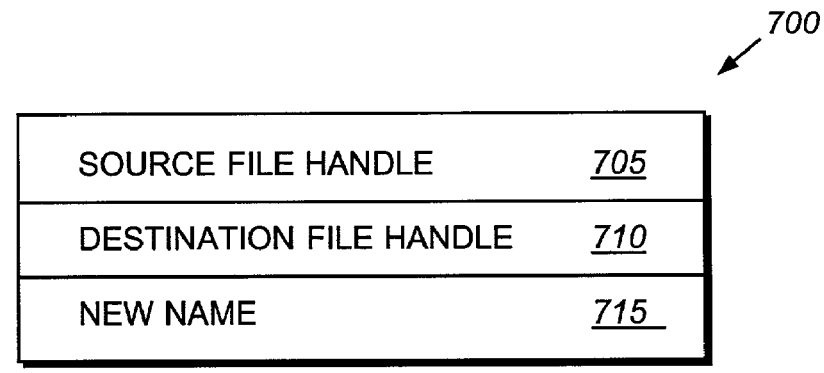
FIG. 7 is schematic block diagram of an exemplary data structure used as an argument to a create link command in accordance with an embodiment of this invention.

After opening the client-private file, a client may desire to transform the file into a regular file that is accessible by other clients. This can be accomplished by creating a link in the directory tree pointing to the client-private file. Generation of a link to the previously client-private file can be accomplished, in the illustrative embodiment, by the DAFS_PROC_LINK command. FIG. 7 is a schematic block diagram of an exemplary data structure passed by a client to the DAFS_PROC_LINK operation. The data structure 700 includes fields for a source file handle 705, a destination file handle 710 and a new name 715. The source file handle refers to the client-private file to which a link is to be added. The destination file handle refers to an existing directory. Given these fields, the distributed file system protocol associates the new name with the source file handle by creating a new entry in the directory associated with the destination file handle.

Figure 8:
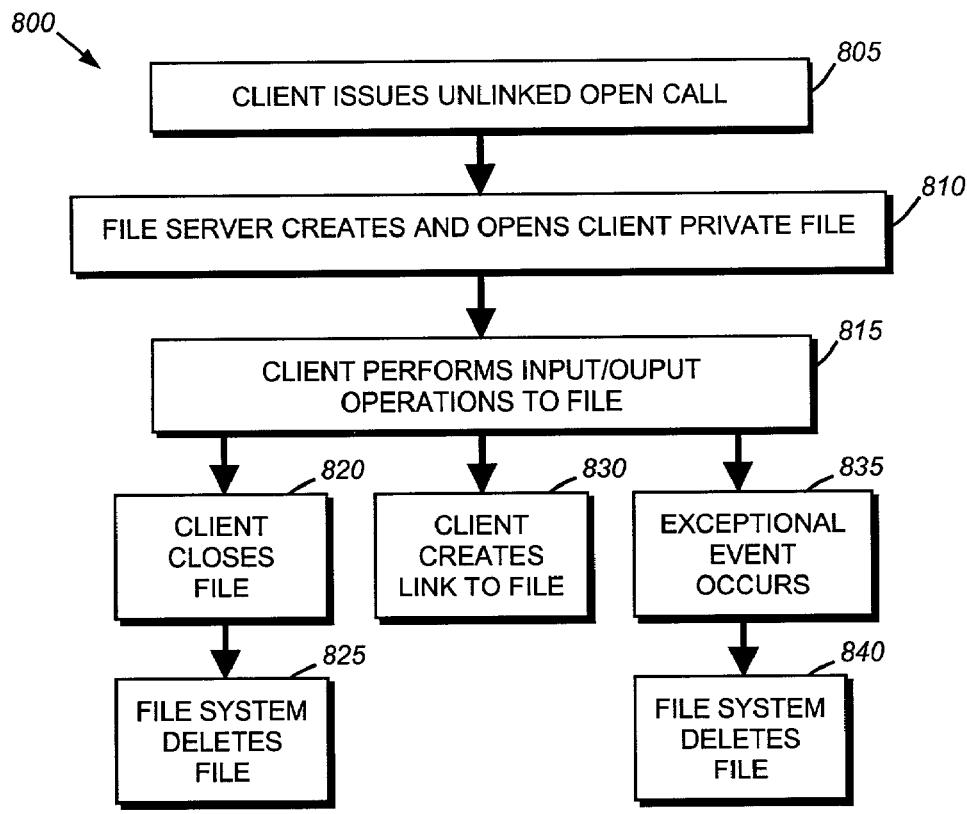
FIG. 8 is a flow chart detailing the steps of a procedure of a client opening a file using the unlinked open command in accordance with an embodiment of this invention.

FIG. 8 is a flow chart illustrating the sequence of steps involved in a procedure 800 of a client utilizing the novel unlinked open function call. Initially, in step 805, the client issues an unlinked open call. In response to the unlinked open call, the file server opens a client-private file in step 810. The client then performs a series of input/output operations to the file in step 815. These input/output (I/O) operations can be of the various types supported by the distributed file system protocol. After all I/O operations to the file are complete, client access to the file is terminated in one of three ways.

The first way of terminating access is illustrated in step 820. Here the client explicitly closes the file without first creating a link to the file. In such a case after the client closes the file (step 820), the file system, in the illustrative embodiment, proceeds to delete the file in step 825. By deleting the closed file that has not been linked to the directory structure of the file system, a file server ensures that unlocateable and inaccessible files will not be left to occupy file system storage space. If the client has not generated a link to the file before closing the file, then the file system deletes the file under the assumption that the file was simply a scratch pad for the temporary storage of data.

The second way of terminating access is illustrated in step 830. Here the client creates a link to the file, which converts the file to be a typical file that is linked into the file system and directory structure. If the client closes the file after creating a link to that file (step 830), the file will continue to exist within the file system and will not be automatically deleted.

The third way of terminating access is illustrated in step 835. Here the client takes no explicit action of any kind. Rather, client access is terminated by some exceptional event, such as failure of the client node, server failure, or server action to revoke the open operation. If the client access is terminated due to such an event, then the file system deletes the file (step 840). This action ensures that in the event of unexpected circumstances that prevent further use of a client-private file, the file will not remain in the file system unless a link has been created to it (step 830).

To again summarize, the present invention provides an extension to a distributed file system protocol that atomically creates client-private files. In the illustrative embodiment, the mechanism extends the DAFS or other distributed file system protocol to include an unlinked open command. Specifically, the DAFS protocol is extended to provide a CLAIM_CREATE_UNLINKED option to the DAFS_PROC_OPEN command. A set of expanded functions 235 is provided within the DAFS server that implements the novel unlinked open functions in accordance with the present invention. When a client requests that a file be opened using the novel unlinked open command, the DAFS server will atomically generate a client-private file. An advantage of the present invention is that atomic creation of client-private files prevents occurrences of client failures, error conditions or crashes between the creation of a file and the unlinking of the file from the file system directory structure.

Figure 9:
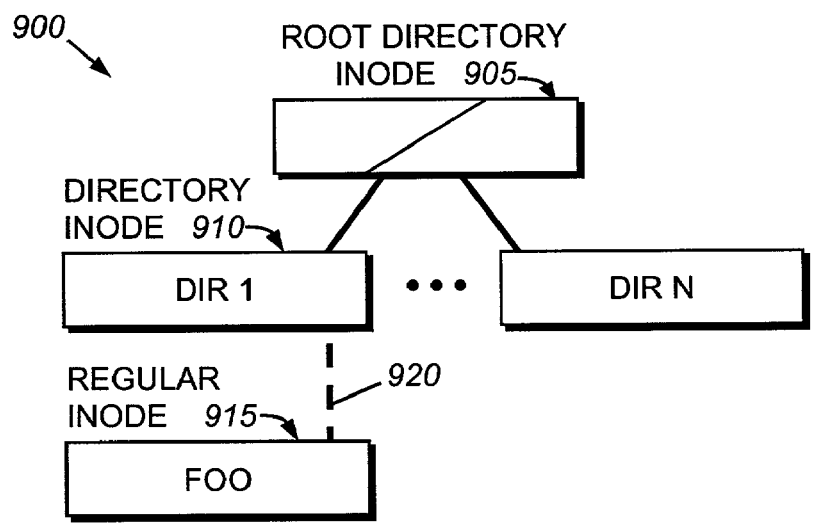
FIG. 9 is a schematic block diagram of an exemplary directory structure and unlinked file in accordance with an embodiment of this invention.

Generation of an unlinked or client-private file is shown in a schematic block diagram in FIG. 9. The root directory inode 905 contains links to various other directory inodes 910, including the directory inode associated with the directory "dir1." If a file entitled "foo" is created using the novel unlinked open command described above, a regular inode 915 is generated. This unlinked file foo 915 is a client-private file that can only be accessed by the client that created it. The client can, by the use of a create link function, generate a link 920 (e.g., a pointer, such as an inode number) that references the file inode 915 from the directory inode 910. After the link 920 is generated, the file foo 915 will be a regular file within the file system.

The foregoing has been a detailed description of the illustrative embodiment of the invention. Various modifications and additions can be made without departing from the spirit and scope of the invention. For example, it is understood that the various data structures can include additional information while remaining within the scope of the present invention. While this description has been written with reference to the DAFS protocol, it should be noted that the principles of the invention apply to any distributed access file system protocol. Further, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention.

What is claimed is:

1. A method for a client to create a client-private file on a server using a distributed file system protocol, the method comprising the steps of:

sending an unlinked open request, the request including a file handle;

creating the client-private file as an unlinked file in response to the unlinked open request;

receiving, by the client, the file handle from the server to directly access the client-private file; and sending an input/output operation by the client to the server using the file handle.

2. The method of claim 1 wherein the file handle is associated with a directory containing the file to be opened.

3. The method of claim 1 wherein the distributed file system protocol is the direct access file system protocol.

4. Apparatus for creating a client-private file on a storage system utilizing a distributed file system protocol, the apparatus comprising:
   means for receiving an unlinked open request to access the file;
   means for creating the client-private file without linking the client-private file to a directory structure associated with a file system;
   means for receiving, by the client, the file handle from the server to directly access the client-private file; and
   means for sending an input/output operation by the client to the server using the file handle.

5. The apparatus of claim 4 wherein the unlinked open request further comprises a file handle identifying a directory to which the client-private file is linked.

6. The apparatus of claim 4 wherein the distributed file system protocol is the direct access file system.

7. A method for managing a client-private file on a storage system, comprising:
   receiving an unlinked open request from a first client;
   creating the client-private file as an unlinked file in response to the unlinked open request;
   performing input/output operation to the client-private file by the first client using a file handle; and
   preventing access to the client-private file by any other clients by the server not performing input/output operations sent by the other clients.

8. The method of claim 7, further comprising:
   creating a link to the client-private file by the client, where the client-private file converts to a typical file that is linked to the storage system.

9. The method of claim 7, further comprising:
   closing the client-private file by the client; and
   deleting the client-private file.

10. The method of claim 7, further comprising:
   receiving an exceptional event occurs; and
   deleting the client-private file.

11. The method of claim 7, further comprising:
   generating, in response to the unlink open request, an inode for the client-private file, the inode not linked to a directory structure on the storage system, the inode accessible by the file handle.

12. A computer readable storage media, comprising:
   said computer readable storage media containing instructions for execution on a processor for the practice of the method of managing a client-private file on a storage system, comprising:
   receiving an unlinked open request from a first client;
   creating the client-private file as an unlinked file in response to the unlinked open request;
   performing input/output operation to the client-private file by the first client using a file handle; and
   preventing access to the client-private file by any other clients.

* * * * *